Nov. 12, 1963 H. W. STEIN 3,110,231
METHOD OF MAKING LITTER BAGS
Original Filed Aug. 17, 1959
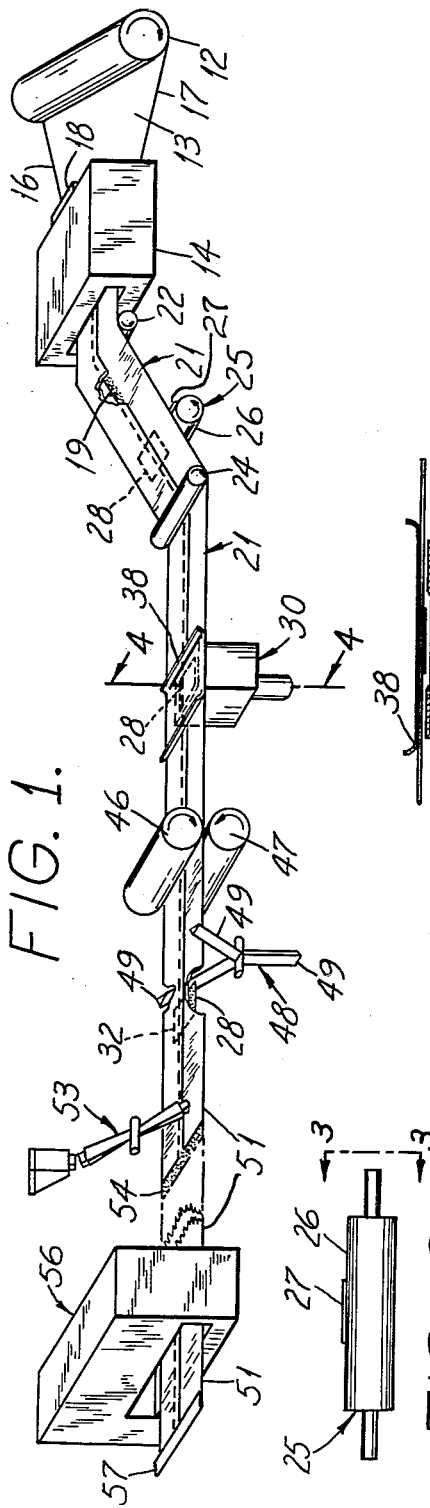
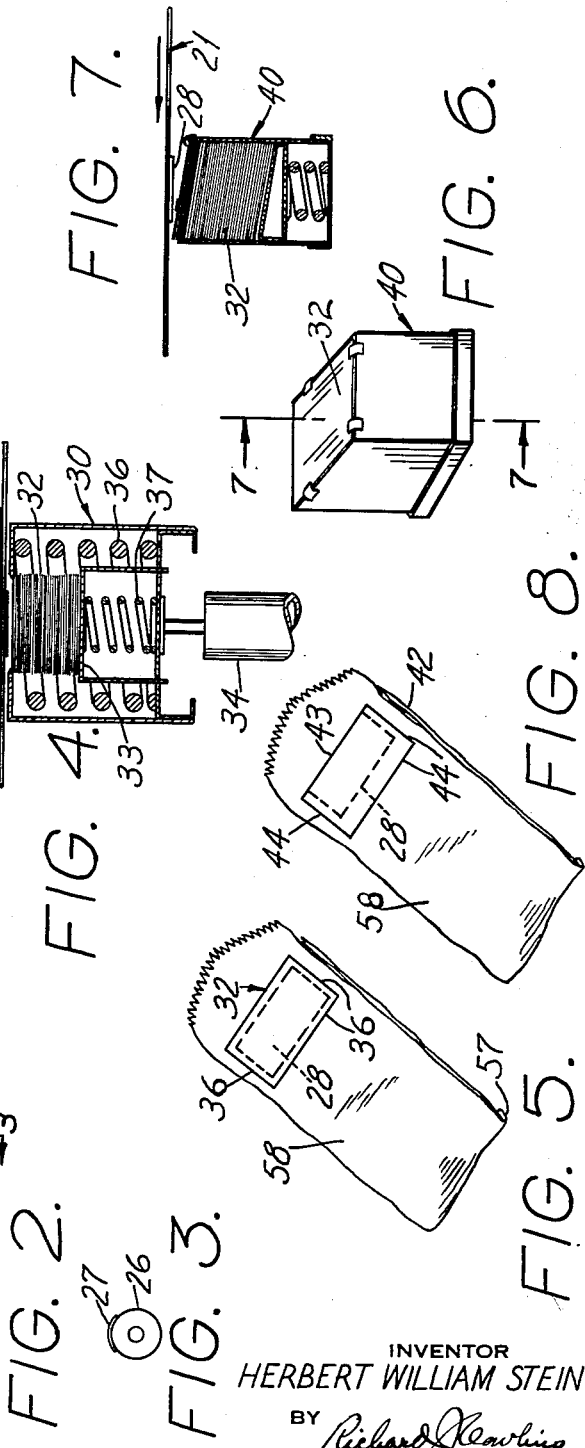
INVENTOR
*HERBERT WILLIAM STEIN*
BY *Richard J Rawling*
ATTORNEY 3,110,231
METHOD OF MAKING LITTER BAGS
Herbert William Stein, Garfield, N.J., assignor to Oneida Paper Products, Inc., Clifton, N.J., a corporation of New Jersey
Continuation of application Ser. No. 834,066, Aug. 17, 1959. This application Jan. 31, 1962, Ser. No. 172,371
1 Claim. (Cl. 93—35)

This application is a continuation of my co-pending application Serial No. 834,066, filed August 17, 1959, entitled Method of Making Litter Bags, which has been abandoned.

The present invention relates generally to disposable litter bags, and it has particular relation to a method of providing such bags with a pressure-sensitive adhesive means for removable attachment to a side of a desk, bed, wall of a room, dashboard of a car and the like.

The disposable litter bags now on the market have a patch or patches of pressure-sensitive adhesive covered with a protective material adapted to be removed before the bag is put into use. One such litter bag is now made manually by applying adhesive to a side of the bag and then manually covering the adhesive patch with a treated removable protective paper. Another such bag is made by applying a preformed patch having pressure-sensitive adhesive on opposite sides and one side covered with a treated removable protective paper. This preformed patch is also applied manually to a side of a finished bag by its unprotected adhesive side. These methods of making such litter bags are expensive and time consuming since much of the work has to be done manually, thereby making the bags quite expensive.

The present invention obviates the manual operations for making such litter bags, and provides a method whereby such bags may be provided with a pressure-sensitive adhesive patch or patches, which are suitably covered with a removable protective strip or strips during the formation of such bags on a conventional bag making or forming machine.

An object of the invention is to provide a method for making self-attaching, readily removable, disposable litter bags on a standard bag machine without requiring a major modification of such machines.

Another object of the invention is the provision of a method whereby self-attaching, self-sealing litter bags having a pressure-sensitive adhesive patch or patches covered with a protective sheet or sheets, which not only covers the adhesive patch but also provides a free edge surrounding all or most of the patch to provide a lift tab for facilitating removal of said protective sheet.

A further object of the invention is to provide a method whereby the patch or patches of pressure-sensitive adhesive serve as a means for picking its own protective sheet or sheets to the endless paper strip or bag tube as it passes through a conventional bag forming machine.

Another object of the invention is the provision of a method whereby the patch or patches of pressure-sensitive adhesive becomes the selecting and securing means for its own protective sheet or sheets as the endless paper strip or bag tube passes through a conventional bag forming machine.

Other and further objects and advantages of the invention reside in the detailed steps of the method, which result in simplicity, economy and efficiency, and which will be apparent from the following description, wherein several preferred embodiments of the invention are shown, reference being had to the accompanying drawings, forming a part hereof, wherein like numerals indicate like parts, in which:

FIGURE 1 is a diagrammatic view of a conventional bag machine operation, showing the several steps used in a method of making a self-attaching, readily removable and disposable litter bag in accordance with the principles of the invention;

FIGURE 2 is an enlarged view of a roller of the type used for applying a patch of pressure-sensitive adhesive to one side of a paper strip or a bag tube as it passes through the machine;

FIGURE 3 is an end view of the roller shown in FIGURE 2, the same having been taken substantially along the line 3—3, looking in the direction of the arrows;

FIGURE 4 is a vertical sectional view of one form of magazine that may be used to apply mechanically the protective covering sheet to the patch of pressure-sensitive adhesive as the same passes thereover, the same having been taken substantially along the line 4—4 of FIGURE 1, looking in the direction of the arrows;

FIGURE 5 is a perspective view, on an enlarged scale, of the self-attaching litter bag made in accordance with the method of the invention illustrated in FIGURES 1 to 4, both inclusive;

FIGURE 6 is a modified self-feeding magazine for holding a stack of protective sheets contiguous to the one side of the bag tube, whereby the passing patch of pressure-sensitive adhesive on the bag strip or tube will contact the forward edge of the top protective sheet in said magazine and pull it from said magazine, whereupon the withdrawn protective sheet is then pressed over the entire area of said adhesive patch to protect the same until it is removed manually;

FIGURE 7 is a vertical sectional view of the angular self-feeding magazine shown in FIGURE 6, the same having been taken substantially along the line 7—7 thereof, looking in the direction of the arrows; and FIGURE 8 is a perspective view, on an enlarged scale, of a self-attaching litter bag made according to the method of the invention illustrated in FIGURES 6 and 7, both inclusive.

Referring now to the drawings, there is shown in FIGURE 1 a diagrammatic view of a conventional bag machine equipped with the necessary attachments for making disposable, self-attaching, litter bags in accordance with the methods forming the subject matter of the invention. These methods require but two simple and inexpensive additions or attachments to any standard bag making machine, to-wit: (1) an additional adhesive applicator of a conventional construction for applying a patch or series of spaced patches of pressure-sensitive adhesive to one side of a continuously moving strip or folded tube of the material from which the bags are to be made and (2) a magazine for holding a stack of precut protective sheets adapted to be used to protect the pressure-sensitive adhesive patch or patches until the bag is ready to be used for the purpose intended.

It will be obvious from the following description that a standard or conventional bag forming or making machine may be easily converted to practise the methods of the invention, and that the same machine may be used at any time thereafter for making regular bags without requiring any reconversion. It is only necessary, when regular bags are to be made, to fail to fill the additional applicator with a supply of pressure-sensitive adhesive. With no adhesive in the applicator no patches will be formed on the continuously moving strip and no protective covering sheets will be withdrawn from the supply magazine since the invention relies on the pressure-sensitive adhesive patch to withdraw its own protective sheet from said supply magazine.

In the method illustrated diagrammatically in FIGURE 1 of the drawings, bag material, which may be paper, plastic or any other suitable material, is fed from an unwinding roll 12 in substantially a horizontal plane, as a flat continuously moving strip of material 13, into a conventional tube former 14, of which there are many different types well known in the industry. The moving strip 13, in passing through the tube former 14, has its side edges 16 and 17 brought together in a superposed position. A conventional liquid glue applicator 18 applies a continuous strip of quick drying glue 19 along one side edge of the moving strip 13. The flat strip 13, entering the tube former 14 on its right side in the drawing, will emerge from its left side as a continuously moving and integrally formed tube 21.

The tube 21 thereupon passes over a supporting guide roller 22 and then under a second supporting guide roller 24. Between the guide rollers 22 and 24 there is mounted on the machine in any suitable manner a second conventional glue or adhesive applicator 25 having an applicator roller 26 that is provided with a raised arcuate surface or platform 27. The size of the platform 27 determines the size of the glue or adhesive patch applied to the adjacent side of the moving tube 21. It will be obvious that, if two or more spaced patches are desired, the roller 26 would have to be provided with an equal number of spaced platforms like the platform 27. The applicator 26 has a supply reservoir (not shown) and with each revolution of the applicator roller 26 the platform 27 picks up a supply of pressure-sensitive adhesive which it transfers to the moving tube 21 in the position desired as patches 28. By a "patch," it is meant a relatively small surface area as compared to the surface area of the side of the bag to which it is applied.

In order that the pressure-sensitive adhesive patches 28 are properly spaced longitudinally of the tube material 21, the proper diameter of the roller 26 or its proper revolving speed must be determined in comparison with the speed of the continuously moving tube 21. These computations are every day occurrences in the industry, and therefore it is not necessary to provide any formula or table for determining the ratios in these respective operations.

It will also be obvious to those skilled in the art that the pressure-sensitive adhesive patches 28 may be applied to either side of the continuously moving strip 13 or tube 21. This may be accomplished by mounting the pressure-sensitive adhesive applicator 25 above or below the continuously moving strip 13 or tube 21. In order to apply the adhesive patch 28 to the moving strip 13, it will be apparent that the applicator 25 must be mounted before the tube former 14.

After the pressure-sensitive adhesive patch 28 is formed on the underside of the continuously moving tube 21, the tube 21 passes through a suitable conventional magazine 30, which contains a stack of pre-cut sheets 32 of any suitable material that will readily adhere to the pressure-sensitive adhesive and may be manually removed therefrom without damaging its adhesive qualities and/or characteristics.

There is shown in FIGURES 1 and 4 a conventional mechanical magazine 30 of the reciprocating piston type, which is intended to be operated in any suitable manner in timely sequence with the pressure-sensitive adhesive roller 26 and its raised platform 27. In this arrangement, a stack of pre-cut protective sheets 32 is positioned on a reciprocating platform 33 of the piston type, which is raised with its stack of pre-cut sheets into a contiguous position with respect of the underside of the continuously moving tube 21 by a reciprocating piston rod 34 operated by a cam turning means (not shown). When the platform 33 is raised, the spring urging means 36 and 37 are placed under compression and when the piston rod 34 is moving downwardly the spring urging means 36 and 37 serve to urge the platform 33 downwardly. These spring urging means merely serve to provide a smooth even movement to the platform 33. It will be noted that a relatively large plate 38 as compared to the size of the platform 33 is mounted directly above the moving tube strip 21 in vertical alignment with the stack 32. This plate 38 serves as a top guide for the moving tube strip 21, and also acts as a stop to prevent the tube strip 21 being pushed out of alignment with the reciprocating feed of the top sheet of the stack 32, as it is moved upwardly against said moving tube strip 21.

With this construction, it will be apparent that each time a patch of pressure-sensitive adhesive 28 is passing directly above the magazine 30, its piston rod 34 will be operated upwardly to bring the top sheet of the stack 32 into contact with the adhesive patch 28, whereupon the patch 28 will pick-up adhesively said sheet 32 and withdraw it from said magazine 30. It is obvious that, with proper timing, each protective sheet 32 will be centered on its patch 28. Since the present protective sheet 32 is made slightly larger than the patch 28 which it is intended to cover, there is left a free non-attached marginal edge 36 surrounding said patch 28. The free edge 36 will serve to provide a tab for facilitating stripping the protective sheet 32 from its patch 28, as best shown in FIGURE 5.

Referring now to FIGURES 6, 7 and 8, there is shown a modified form of spring urged magazine 40, which is relatively simple and inexpensive, requiring no timing mechanism, etc. This magazine 40 is to be mounted in an angular position with respect of the continuously moving tube 21 in the same position as the mechanical magazine 30. In this arrangement, the stack of sheets 32 is held and maintained at an acute upward angle against the underside of the moving strip 21 with the forward edge of each sheet 28 substantially contiguous to the surface of the moving tube 21. In this position, the forward edge of each pressure-sensitive adhesive patch 28 will contact and adhesively pick-up the forward edge of the protective sheet 32 and withdraw it from the magazine 40. The protective sheets 32 mounted by means of the magazine 40 will not be positioned centrally on the patches 28, but the top or forward edge of the protective sheet 32 and the forward edge of the adhesive patch 28 will be in substantially transverse alignment on the finished bag 42, as indicated at 43 and as best shown in FIGURE 8, leaving a free marginal edge 44 around the other three sides of the patch to provide a tab for facilitating its removal when desired from the finished bag 42.

After the protective sheets 32 are withdrawn by their respective adhesive patches 28, they pass between a pair of oppositely driven rollers 46 and 47, whereupon they are pressed together over their entire area to form a series of longitudinally spaced laminated units on the tube 21.

The tube 21 continues to move forwardly of the bag forming machine and through a conventional cutter 48, consisting of a series of spaced revolving knife blades 49 which cut the same into equal lengths 51, each length 51 having a pressure-sensitive adhesive patch 28 covered with a protective sheet 32. Each length 51 then passes through a quick-drying liquid glue applicator 53, which applies a narrow transversely extending strip of glue 54 adjacent the forward end thereof. The length, piece or section 51 then moves into a conventional bag folder 56, wherein its forward end is folded backwardly upon itself and over said glue strip 54 to form a sealed bottom 57 of a finished bag 58.

It will be obvious from the drawings and specification that the length and width, or size, of the patch, or the number of patches, may be varied as desired. They will be dependent more or less upon the size of the bag, the nature of the bag material, the quality of adhesive, etc. It is impossible to give any exact data as to the size of the area or areas of said pressure-sensitive adhesive as compared to the size of each bag because of the large number of unknown variables involved. The main purpose of the patch or patches 28 is to support the bag 58 when filled with refuse.

The term "pressure-sensitive adhesive" is intended to include any adhesive that does not require wetting but merely pressure to bring out its adhesive characteristics. The term "glue" is used to denote an inexpensive adhesive such as is commonly used in sealing the seams of conventional bags, and requires wetting to bring out its adhesive characteristics.

Although I have shown and described but two embodiments which the invention may assume, it will be readily apparent to those skilled in the art that various other modifications may be made therein without departing from the spirit thereof or from the scope of the appended claim.

What I claim is:

The method of making a self-attaching litter bag having a removable layer of treated paper extending over a pressure-sensitive adhesive patch from which it can be removed readily without damaging said bag comprising:

(a) moving a continuous strip of bag paper in a single plane, (b) applying a continuous strip of glue to one side edge of said strip of paper, (c) sealing said side edges of said strip to form a tube, (d) applying at least one patch of pressure-sensitive adhesive to one side of said tube at longitudinally spaced intervals, (e) positioning a magazine having a stack of pre-cut removable protective sheets in angular contact with the side of said continuous moving strip having the patches thereon, (f) contacting each patch of pressure-sensitive adhesive with the forward edge of the top sheet in said magazine to secure it thereto and remove it therefrom, (g) pressing the selected sheet to the remaining area of said patch to provide a complete protective cover therefor, (h) cutting said tube transversely at regular spaced intervals spaced longitudinally from said patch into individual pieces, (i) applying a strip of glue transversely to the exposed surface of each piece adjacent its forward end, and (j) then folding the forward end of each individual tube upon itself and over said transversely extending strip of glue to seal the same to form a bag.

References Cited in the file of this patent

UNITED STATES PATENTS

| | | |
|---|---|---|
| 2,281,964 | Wolf | May 5, 1942 |
| 2,554,821 | Garfunkel | May 29, 1951 |
| 2,774,531 | Rosenthal | Dec. 18, 1956 |

FOREIGN PATENTS

| | | |
|---|---|---|
| 157,934 | Great Britain | Aug. 11, 1921 |